United States Patent

(12) United States Patent
Seo et al.

(10) Patent No.: US 8,477,016 B2
(45) Date of Patent: Jul. 2, 2013

(54) METHOD FOR IDENTIFYING TAGS USING ADAPTIVE BINARY TREE SPLITTING TECHNIQUE IN RFID SYSTEM AND RFID SYSTEM THEREFORE

(75) Inventors: Kyung-Ho Seo, Seongnam-si (KR); Won-Jun Lee, Seoul (KR); Ji-Hoon Myung, Seoul (KR); Jin-Hee Yoon, Seoul (KR); Joo-Mun Lee, Yongin-si (KR); Sang-Yun Lee, Seongnam-si (KR); Myung-Sung Lee, Seoul (KR)

(73) Assignees: SK Planet Co., Ltd. (KR); SK Telecom Co., Ltd. (KR)

( * ) Notice: Subject to any disclaimer, the term of this patent is extended or adjusted under 35 U.S.C. 154(b) by 1207 days.

(21) Appl. No.: 11/574,189

(22) PCT Filed: Sep. 8, 2006

(86) PCT No.: PCT/KR2006/003581
§ 371 (c)(1),
(2), (4) Date: Jan. 16, 2008

(87) PCT Pub. No.: WO2007/037595
PCT Pub. Date: Apr. 5, 2007

(65) Prior Publication Data
US 2009/0040021 A1    Feb. 12, 2009

(30) Foreign Application Priority Data
Sep. 30, 2005 (KR) .................... 10-2005-0092095

(51) Int. Cl.
*H04Q 5/22* (2006.01)
(52) U.S. Cl.
USPC ................ 340/10.2; 340/10.4; 340/10.31

(58) Field of Classification Search
USPC ...................... 340/10.1, 10.2, 10.3
See application file for complete search history.

(56) References Cited

U.S. PATENT DOCUMENTS

| 3,686,637 | A  | * | 8/1972  | Zachar et al. ............... 711/5 |
| 5,550,547 | A  | * | 8/1996  | Chan et al. ............... 342/42 |
| 5,751,570 | A  | * | 5/1998  | Stobbe et al. ............ 700/11 |
| 5,841,770 | A  |   | 11/1998 | Snodgrass et al. |
| 6,061,344 | A  | * | 5/2000  | Wood, Jr. ................ 370/346 |
| 6,275,476 | B1 | * | 8/2001  | Wood, Jr. ................ 370/312 |
| 6,321,230 | B1 | * | 11/2001 | Joslin et al. ................. 1/1 |
| 6,456,191 | B1 | * | 9/2002  | Federman ............. 340/10.2 |

(Continued)

OTHER PUBLICATIONS

ISO/IEC 2004, ISO/IEC 18000-6, Information Technology—Radio Frequency Identification for Item Management.

*Primary Examiner* — Jennifer Mehmood
*Assistant Examiner* — Rufus Point
(74) *Attorney, Agent, or Firm* — Baker & Hostetler LLP

(57) ABSTRACT

The RFID system includes an RFID reader for sending information selected from among collision type information, idle type information, and readable type information, to all of the RFID tags depending on the number of signals in the corresponding time slot, and RFID tags for performing functions, in which, when information, indicating that a current time slot is a collision type, is fed back from the RFID reader, each of RFID tags selects one arbitrary value of either 0 or 1 and is assigned a time slot, in which a corresponding RFID tag will send a signal to the RFID reader, based on the selected value, a single tag group that caused a collision is divided into two sub-groups depending on the assigned time slots, and tags of the sub-groups send signals, including IDs thereof, to the RFID reader in different time slots for the respective sub-groups.

20 Claims, 5 Drawing Sheets

| reading period | progress slot counter | assigned slot counter | | | termination slot counter | feedback of reader | remark |
|---|---|---|---|---|---|---|---|
| | | tag A | tag B | tag C | reader | | |
| 1 | 0 | 0 | 0 | 0 | 1 | Collision | |
| 2 | 0 | 0 | 0 | 1 | 2 | Collision | |
| 3 | 0 | 1 | 1 | 2 | 3 | Idle | |
| 4 | 0 | 0 | 0 | 1 | 2 | Collision | |
| 5 | 0 | 0 | 1 | 2 | 3 | Readable | tag A identified |
| 6 | 1 | 0 | 1 | 2 | 3 | Readable | tag B identified |
| 7 | 2 | 0 | 1 | 2 | 3 | Readable | tag C identified |
| 8 | 3 | 0 | 1 | 2 | 3 | none | termination of identification process |

U.S. PATENT DOCUMENTS

| | | | |
|---|---|---|---|
| 6,538,563 B1 * | 3/2003 | Heng | 340/10.2 |
| 6,724,297 B1 * | 4/2004 | Vacherand et al. | 340/10.3 |
| 6,727,803 B2 * | 4/2004 | Hulvey | 340/10.31 |
| 6,859,801 B1 * | 2/2005 | Law et al. | 1/1 |
| 7,011,250 B2 * | 3/2006 | Nakabe et al. | 235/487 |
| 7,068,148 B2 * | 6/2006 | Shanks et al. | 340/10.1 |
| 7,075,412 B1 * | 7/2006 | Reynolds et al. | 340/10.2 |
| 7,173,518 B2 * | 2/2007 | Hulvey | 340/10.31 |
| 7,193,504 B2 * | 3/2007 | Carrender et al. | 340/10.4 |
| 7,315,522 B2 * | 1/2008 | Wood, Jr. | 370/312 |
| 7,369,036 B1 * | 5/2008 | Vacherand et al. | 340/10.1 |
| 7,405,657 B2 * | 7/2008 | Chon et al. | 340/572.1 |
| 7,425,888 B2 * | 9/2008 | Powell | 340/10.2 |
| 7,626,503 B2 * | 12/2009 | Choi et al. | 340/572.1 |
| 7,764,164 B2 * | 7/2010 | Tanaka | 340/10.2 |
| RE41,471 E * | 8/2010 | Wood, Jr. | 370/346 |
| 7,920,046 B1 * | 4/2011 | Aiouaz et al. | 340/3.63 |
| 7,973,644 B2 * | 7/2011 | Tuttle | 340/10.1 |
| 8,040,829 B2 * | 10/2011 | Wood, Jr. | 370/312 |
| 2001/0043569 A1 | 11/2001 | Wood, Jr. | |
| 2004/0135674 A1 * | 7/2004 | Shanks et al. | 340/10.1 |
| 2005/0280505 A1 * | 12/2005 | Humes et al. | 340/10.1 |
| 2006/0044114 A1 * | 3/2006 | Friedrich et al. | 340/10.2 |
| 2006/0103505 A1 * | 5/2006 | Hulvey | 340/10.2 |

* cited by examiner

| reading period | progress slot counter | assigned slot counter | | | termination slot counter | feedback of reader | remark |
|---|---|---|---|---|---|---|---|
| | | tag A | tag B | tag C | reader | | |
| 1 | 0 | 0 | 0 | 0 | 1 | Collision | |
| 2 | 0 | 0 | 0 | 1 | 2 | Collision | |
| 3 | 0 | 1 | 1 | 2 | 3 | Idle | |
| 4 | 0 | 0 | 0 | 1 | 2 | Collision | |
| 5 | 0 | 0 | 1 | 2 | 3 | Readable | tag A identified |
| 6 | 1 | 0 | 1 | 2 | 3 | Readable | tag B identified |
| 7 | 2 | 0 | 1 | 2 | 3 | Readable | tag C identified |
| 8 | 3 | 0 | 1 | 2 | 3 | none | termination of identification process |

| reading period | progress slot counter | assigned slot counter | | | termination slot counter | feedback of reader | remark |
|---|---|---|---|---|---|---|---|
| | | tag A | tag B | tag C | reader | | |
| 1 | 0 | 0 | 0 | 0 | 1 | Collision | |
| 2 | 0 | 0 | 0 | 1 | 2 | Collision | |
| 3 | 0 | 0 | 1 | 2 | 3 | Readable | tag A identified |
| 4 | 1 | 0 | 1 | 2 | 3 | Readable | tag B identified |
| 5 | 2 | 0 | 1 | 2 | 3 | Readable | tag C identified |
| 6 | 3 | 0 | 1 | 2 | 3 | | termination of identification process |

FIG. 5

| reading period | progress slot counter | assigned slot counter | | | termination slot counter | feedback of reader | remark |
|---|---|---|---|---|---|---|---|
| | | tag A | tag B | tag C | reader | | |
| 1 | 0 | 0 | 1 | 2 | 3 | Readable | tag A identified |
| 2 | 1 | 0 | 1 | 2 | 3 | Readable | tag B identified |
| 3 | 2 | 0 | 1 | 2 | 3 | Readable | tag C identified |
| 4 | 3 | 0 | 1 | 2 | 3 | | termination of identification process |

FIG. 6

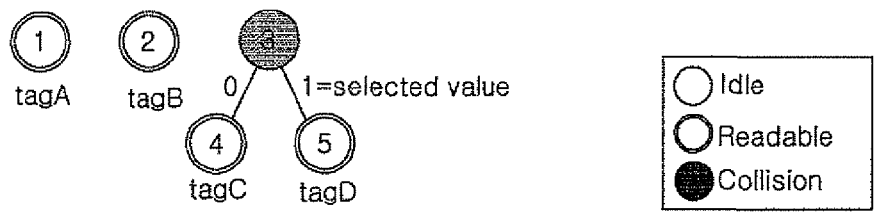

FIG. 7

| reading period | progress slot counter | assigned slot counter | | | | termination slot counter | feedback of reader | remark |
|---|---|---|---|---|---|---|---|---|
| | | tag A | tag B | tag C | tag D | reader | | |
| 1 | 0 | 0 | 1 | 2 | 2 | 3 | Readable | tag A identified |
| 2 | 1 | 0 | 1 | 2 | 2 | 3 | Readable | tag B identified |
| 3 | 2 | 0 | 1 | 2 | 2 | 3 | Collision | |
| 4 | 2 | 0 | 1 | 2 | 3 | 4 | Readable | tag C identified |
| 5 | 3 | 0 | 1 | 2 | 3 | 4 | Readable | tag D identified |
| 6 | 4 | 0 | 1 | 2 | 3 | 4 | | termination of identification process |

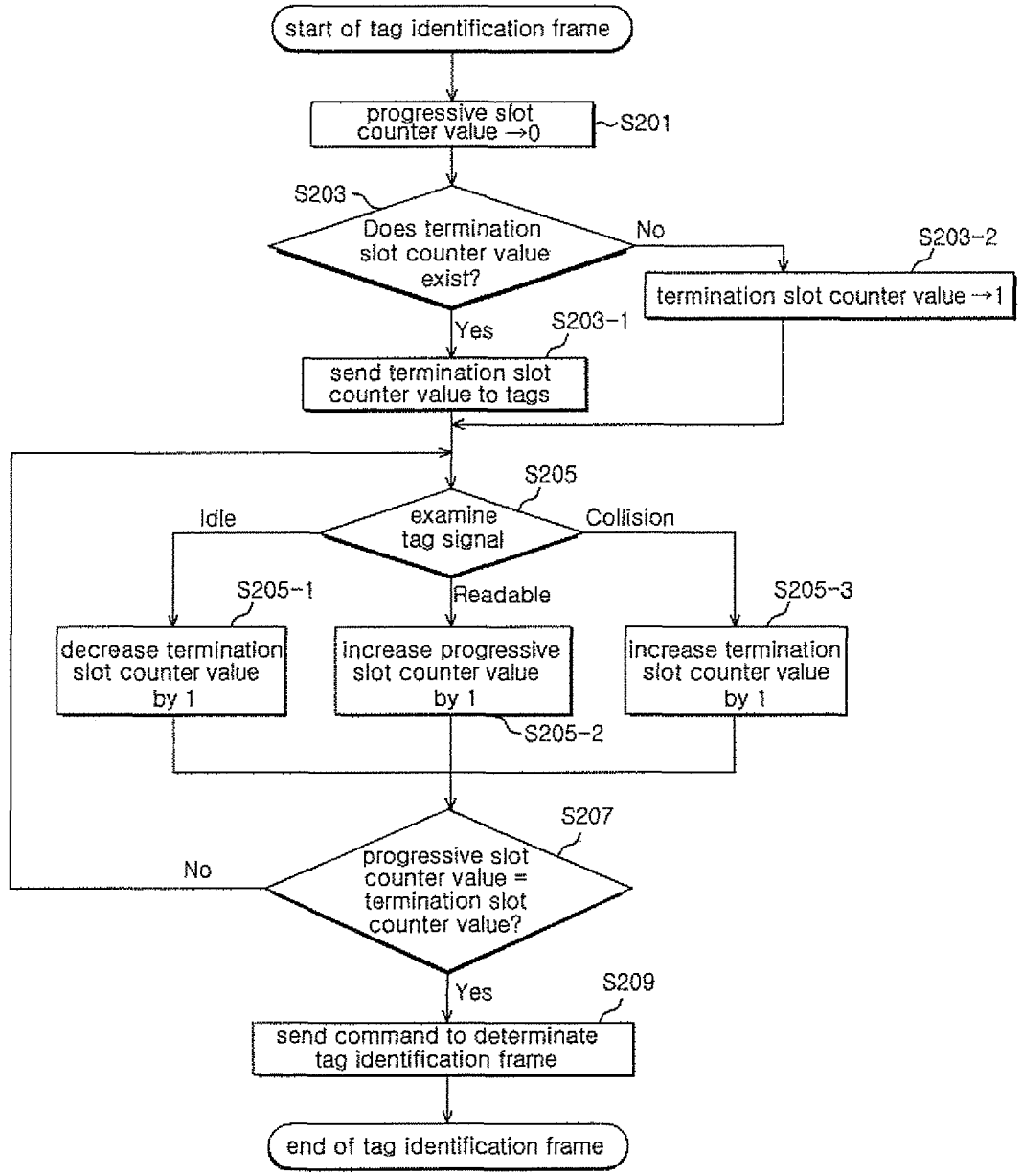

US 8,477,016 B2

METHOD FOR IDENTIFYING TAGS USING ADAPTIVE BINARY TREE SPLITTING TECHNIQUE IN RFID SYSTEM AND RFID SYSTEM THEREFORE

TECHNICAL FIELD

The present invention relates to a method of identifying a plurality of tags using an adaptive binary tree splitting technique in a radio frequency identification system, which is intended not only to adaptively and rapidly identify radio frequency identification tags but also to limit the number of collisions, and a radio frequency identification system therefor.

BACKGROUND ART

Radio Frequency Identification (RFID) systems, which are expected to be technically promising systems in the future ubiquitous computing era, are systems for automatically identifying objects by reading information from tags, attached to the objects, through readers. The most important functional issue for RFID readers is that the RFID readers can rapidly identify all tags.

However, when two or more tags send signals over a single radio channel at the same time, the radio signals collide, and the occurrence of such a collision may result in cases where it obstructs the rapid identification of tags or prevents the readers from identifying tags. Accordingly, new RFID tag identification techniques capable of reducing the frequency of the occurrence of collisions and rapidly identifying tags even though collisions occur in an RFID system, including a plurality of readers and low functionality tags, are required.

Tag identification protocols may be classified into Aloha-based protocols and tree-based protocols. The Aloha-based tag identification protocols employ a method in which tags select a random time and send the Identifications (IDs) thereof to a reader. Various variants thereof include Pure Aloha, Slotted Aloha, and Frame Slotted Aloha.

The Aloha-based protocols can reduce the frequency of the occurrence of collisions from the point of view of probability, but cannot completely prevent the occurrence of collisions. In particular, in the Aloha-based protocols, a tag starvation problem, in which a specific tag is not identified by a reader for a long time due to a collision, may arise. Such a tag starvation phenomenon is a very great disadvantage to applications that attach great importance to accuracy, such as logistic management. Accordingly, the Aloha-based protocols are a representative example of probabilistic anti-collision protocols because the Aloha-based protocols cannot guarantee the identification of all tags.

In contrast, the tree-based tag identification protocols are tag identification techniques for tracking the occurrence of collisions and detecting the existence of tags. A representative of the tree-based tag identification protocol is a binary tree protocol that is used in ISO/IEC 18'-6, type B. The binary tree protocols employ a method of dividing tags into two groups at the time of a collision using, a tag counter and a random number generator and extending the search space. Meanwhile, in the query tree protocols, a query, including a several-bit prefix, is sent, and only a tag possessing an ID coinciding with the prefix responds, using its own ID.

The query tree protocols have an advantage in that the function of the tags is simple compared to that of the binary tree protocols because the tags determine only whether IDs coincide with prefixes, but have a problem in that a significant identification delay may occur according to the type of distribution of the tag IDs. The tree-based tag identification protocols do not cause tag starvation, but cause a significant identification delay.

Accordingly, a tag identification technique for enabling a reader to rapidly identify all tags without tag starvation is required.

DISCLOSURE OF THE INVENTION

Accordingly, the present invention has been made keeping in mind the above problems occurring in the prior art, and an object of the present invention is to provide a method of identifying a plurality of tags using an adaptive binary tree splitting technique in an RFID system, which is a kind of tree-based tag identification protocol, and which reduces the high search overhead of a binary tree technique while ensuring the identification of all tags, suppresses the occurrence of collisions between the signals of the tags, and enables a reader to rapidly identify all tags without tag starvation, and an RFID system therefor.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a tag identification table illustrating a method of re-identifying identified tags according to the present invention;

FIG. 6 is a conceptual diagram illustrating a method of re-identifying tags when a new tag enters, according to the present invention;

FIG. 7 is a tag identification table based on FIG. 6;

FIG. 9 is a flowchart sequentially illustrating the reader operation of the method of identifying tags according to the embodiment of the present invention.

BEST MODE FOR CARRYING OUT THE INVENTION

Figures 1, 2:
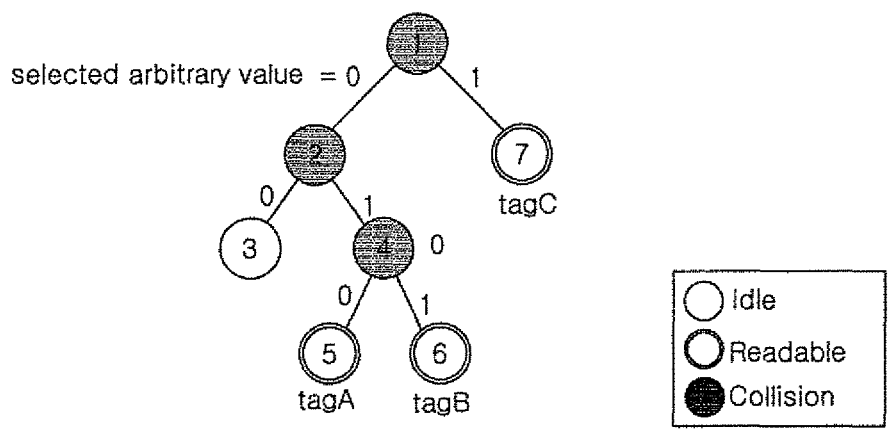
FIG. 1 is a conceptual diagram illustrating an embodiment of a method of identifying tags in an RFID system according to the present invention.
FIG. 2 is a tag identification table based on FIG. 1.

In order to accomplish the above object, the present invention provides an RFID system for enabling an RFID reader to identify all RFID tags through continuous communication between the RFID tags and the RFID reader, including, when a period, in which the RFID tags each send a signal, including an ID, to the RFID reader and the RFID reader sends feedback, is defined as a time slot, the RFID reader for sending one piece of information selected from among collision type information, indicating that signals from the RFID tags collide with each other; idle type information, indicating that there are no signals from the RFID tags; and readable type information, indicating that a signal has been received from a single RFID tag and the corresponding RFID tag has been identified, to all of the RFID tags within an identification range of the RFID reader, as type information of a specific time slot, depending on the number of signals sent from the RFID tags in the corresponding time slot; and the RFID tags for performing functions, in which, when information, indicating that a current time slot is a collision type, is fed back from the RFID reader, each of RFID tags that caused a collision selects one arbitrary value of either 0 or 1 and is assigned a time slot, in which a corresponding RFID tag will send a signal to the RFID reader, based on the selected value, a single tag group that caused a collision is divided into two sub-groups depending on the assigned time slots, and tags of the sub-groups send signals, including IDs thereof, to the RFID reader in different time slots for the respective sub-groups; wherein the RFID reader can identify all of the RFID tags in such a way that all of the RFID tags send signals to the RFID reader in different time slots.

In order to accomplish the above object, the present invention provides a method of identifying a plurality of tags using an adaptive binary tree splitting technique in an RFID system, the method, when a period, in which RFID tags each send a signal, including an ID, to an RFID reader and the RFID reader sends a feedback, is defined as a time slot, and a plurality of time slots, which are required by the RFID reader to identify all the RFID tags within a current identification range of the RFID reader, constitutes a tag identification frame, enabling the RFID reader to identify all of the RFID tags in such a way that the RFID tags send signals in different time slots of a single tag identification frame: wherein each of the RFID tags has a progressive slot counter value, indicating the number of time slots in each of which an RFID tag has been identified, and an assigned slot counter value, that is, a time slot number, indicating a sequential position for sending of a signal to the RFID reader; the method including a first step of initializing the progressive slot counter value to 0 at a start of a tag identification frame; a second step of determining whether the assigned slot counter value of the RFID tag is identical to the progressive slot counter value in a current time slot, and sending a signal, including an ID thereof, to the RFID reader if the two values are identical to each other, and maintaining a standby state if the two values are not identical to each other; a third step of setting the progressive slot counter value and the assigned slot counter value according to received time slot type information when one piece of information selected from collision type information, indicating that signals from the RFID tags collide with each other, idle type information, indicating that there are no signals from the RFID tags, and readable type information, indicating that a signal has been received from a single RFID tag and the corresponding RFID tag has been identified, is received from the RFID reader that feeds type information of the current time slot back to all the RFID tags within an identification range of the RFID reader, depending on the number of signals received from the RFID tags; and a fourth step of terminating the tag identification frame if all of the tags within the identification range of the RFID reader have been identified by the RFID reader, and returning to the second step if all of the tags have not been identified.

In order to accomplish the above object, the present invention provides a method of identifying a plurality of tags using an adaptive binary tree splitting technique in an RFID system, the method, when a period, in which RFID tags each send a signal, including an ID, to an RFID reader and the RFID reader sends a feedback, is defined as a time slot, and a plurality of time slots, which are required by the RFID reader to identify all the RFID tags within a current identification range of the RFID reader, constitutes a tag identification frame, enabling the RFID reader to identify all the RFID tags in such a way that the RFID tags send signals in different time slots of a single tag identification frame: wherein the RFID has a progressive slot counter value, indicating the number of time slots in each of which an RFID tag has been identified, and a termination slot counter value, indicating the number of tag groups to be identified; the method comprising a first step of initializing the progressive slot counter value there of to 0 at a start of a tag identification frame; a second step of feeding one piece of information selected from collision type information, indicating that signals from the RFID tags collide with each other, idle type information, indicating that there are no signals from the RFID tags, and readable type information, indicating that a signal has been received from a single RFID tag and the corresponding RFID tag has been identified, back to all the RFID tags within the identification range of the RFID reader, as type information of a current time slot, depending on the number of signals received from the RFID tags, in the current time slot, and setting the progressive slot counter value and termination slot counter value of the RFID reader according to the sent time slot type information; and a third step of determining whether the progressive slot counter value is identical to the termination slot counter value, terminating the tag identification frame if the two values are identical to each other, and returning to step 2 if the two values are not identical to each other.

Prior to a description of the drawings, a method of identifying tags using an adaptive binary tree splitting technique according to the present invention is described below.

In the tag identification method using an adaptive binary tree splitting technique according to the present invention, a channel through which tags send signals to a reader is slotted and the reader repeats an identification process to identify the tags. In a single time slot, tags send the IDs thereof to the reader and the reader sends feedback information to all the tags within the identification range thereof according to the received signal.

The feedback information is any one of 'Idle', indicating the state in which a signal has not been received from any tag, 'Readable', indicating that only a single signal has been received, and thus a corresponding tag has been identified, and 'Collision', indicating that two or more signals have been received, and thus a tag has not been identified. Such feedback information informs all tags of the results of signal reception by the reader.

A tag determines a time slot, in which it sends a signal to the reader, using a progressive slot counter value and an assigned slot counter value.

The progressive slot counter value refers to the number of tags that have been identified by the reader in a current tag identification process. At the start of a tag identification process, the progressive slot counter value is set to 0, and a tag sends its ID when the assigned slot counter value is identical to the progressive slot counter value.

Tags having the same assigned slot counter value form a single group. In the case where a single group includes a plurality of tags, the plurality of tags send IDs in the same time slot, therefore a collision occurs.

Meanwhile, the operation of the tags according to the feedback information of the reader is as follows.

First, when the reader sends readable type information as the feedback information, a tag increases its progressive slot counter value by 1.

When the reader sends idle type information as the feedback information, a tag decreases its assigned slot counter value by 1 if the progressive slot counter value is less than the assigned slot counter value. That is, when no tag sends a signal to the reader in a current time slot, tags decrease their assigned slot counter values so as to advance the time points for sending the tag signals, thus eliminating an unnecessary time slot in which no signal is sent.

Thereafter, when the reader sends collision type information as the feedback information, the progressive slot counter value and assigned slot counter value of the tags, which have caused signals to collide with each other, are identical to each other. When the progressive slot counter value of each tag is identical to its assigned slot counter value, the tag selects an arbitrary binary number of either 0 or 1 and adds the selected number to its assigned slot counter value, so that tags, having the same assigned slot counter value, are divided into two sub-groups. That is, tags, the signals of which have collided with each other, are divided into sub-groups.

In this case, since the progressive slot counter value is unchanged, a sub-group of tags, having selected 0 and having added 0 to the assigned slot counter value, send signals in a subsequent time slot again, and a sub-group, having selected 1 and having added 1 to the assigned slot counter value, send signals again after a previous sub-group has been identified.

The process of division into sub-groups continues until the tags can send signals without collisions.

Meanwhile, the tags whose, the assigned slot counter value is less than the progressive slot counter value, are not tags that have caused collisions, the tags each increase their assigned slot counter value by 1 when the reader sends collision type information as the feedback information, thereby preventing the tags from merging with the tags that selected 1 and were divided into the sub-groups.

According to the feedback information from the reader, the tags according to the present invention continuously communicate with the reader while adjusting their progressive slot counter values and assigned slot counter values until all of the tags have been identified. As a result, at the end of a single identification process, respective tags have unique assigned slot counter values.

Meanwhile, in the present invention, the reader has a termination slot counter value, indicating the number of tag groups that should be identified by the reader in a tag identification process, and a progressive slot counter value identical to that of the tags. The reader becomes aware that all of the tags have been identified when the termination slot counter value is identical to the progressive slot counter value, and thus terminates a tag identification process.

The reader initializes the progressive slot counter value to 0 at the start of a tag identification process in the same manner as a tag, and initializes the termination slot counter value to 1. If the termination slot counter value in a previous tag identification process is being maintained, the reader does not initialize the termination slot counter value.

When tag signals collide with each other (transmission of collision type information), one tag group is divided into two sub-groups, therefore the number of groups to be identified increases by 1, and the reader increases the termination slot counter value by 1. If a tag is identified (transmission of readable type information), the reader increases the progressive slot counter value by 1. If a tag signal is not received (transmission of idle type information), the reader decreases the termination slot counter value by 1.

Details of the object, technical construction and corresponding operational effects of the present invention will be more clearly understood through the following detailed description, based on the drawings attached to the specification of the present invention.

FIG. 1 is a conceptual diagram illustrating an embodiment of a method of identifying tags in an RFID system according to the present invention, and FIG. 2 is a tag identification table based on FIG. 1. The embodiments of FIGS. 1 and 2 illustrate a process of identifying tags A, B and C, each of which has an assigned slot counter value of 0 prior to identification.

In the following description, the time required to identify all of the tags within the transmission range of the reader is defined as a tag identification frame, and the tag identification frame is composed of time slots, each of which has a specific time period. In respective time slots, the tags send their IDs, and the reader receives signals from the tags.

In FIGS. 1 and 2, the reader and the tags first operate, the assigned slot counter value of each tag is initialized to 0, and the termination slot counter value of the reader is initialized to 1. In this case, the termination slot counter value of the reader refers to the number of tag groups that should be identified by the reader.

As illustrated in FIG. 1, since, at the start of a tag identification frame, the progressive slot counter value is 0 and the assigned slot counter values of tags A, B and C are each 0, all three tags send signals in the first reading period of the tag identification frame, and thus a collision occurs. The number, indicated inside each circle in the drawing, represents a reading period.

In this case, each of the tags, having caused a collision, selects either 0 or 1 and adds the selected number to its assigned slot counter value thereof. Tags A and B, having selected 0, constitute a sub-group and tag C, having selected 1, constitutes another sub-group; thus a tag group, composed of tags A to C, is divided into two sub-groups.

Thereafter, tags A and B, having selected 0, simultaneously send signals again in a second reading period, and thus a collision occurs. If tags A and B both select 1, there is no tag having an assigned slot counter value of 0, therefore no tag sends a signal in a third reading period. Accordingly, in the third reading period, the reader sends idle type information to the tags, and each of the tags and the reader decreases the assigned slot counter value by 1.

Thereafter, tags A and B, each having an assigned slot counter value of 0 again, cause a collision in a fourth reading period. If tag A selects 0 and tag B selects 1, tag A, having an assigned slot counter value of 0, is identified and the progressive slot counter value becomes 1 in a fifth reading period. In a sixth reading period, tag B, having an assigned slot counter value of 1, is identified and the progressive slot counter value becomes 2.

Thereafter, in a seventh reading period, tag C, having an assigned slot counter value of 2, is identified, the progressive slot counter value becomes 3, the reader becomes aware that the termination slot counter value thereof is identical to the progressive slot counter value, and thus terminates the tag identification frame.

With reference to FIG. 2, the above-described process will be described again below.

Assuming all tags and a reader are performing first tag identification process, at the start of a tag identification frame the progressive slot counter value of the tags and the reader is initialized to 0, the assigned slot counter values of respective tags are initialized to 0, and the termination slot counter value of the reader is initialized to 1.

In a first reading period, the progressive slot counter value is 0, therefore tags A, B and C having an assigned slot counter value of 0 all send signals to the reader. Accordingly, the reader sends collision-type information to the tags as the type information of the current time slot.

In the present invention, when tags have caused a collision, each tag selects one of the binary numbers 0 or 1 and adds it to their assigned slot counter value, and the reader increases the termination slot counter value by 1. Therefore, the assigned slot counter value of tags A and B, which selected 0 at the end of the first reading period, is 0, the assigned slot counter value of tag C, which selected 1, is 1, and the termination slot counter value of the reader is 2.

Next, in a second reading period, when tags A and B, which have an assigned slot counter value of 0, send signals again, the reader sends collision type information to all of the tags (tags A, B and C) located within the identification range of the reader, as the type information of a current time slot.

In the present invention, when tags have caused a collision, the tags that caused the collision are divided into two subgroups. For this purpose, the tags that caused the collision (tags that received collision type information) each compare their assigned slot counter value and the progressive slot counter value, if the two values are found to be identical to each other, become aware that the tag itself is a tag having caused the collision, select one of the binary numbers 0 and 1, and add the selected number to their assigned slot counter value.

In this case, a tag that did not cause any collision can have the same assigned slot counter value as a tag that caused a collision, having selected 1 and having added 1 to its assigned slot counter value, in which case the tags that have the same assigned slot counter values coexist and cause a collision again. Accordingly, a tag which has received collision type information and has an assigned slot counter value that is not identical to the progressive slot counter value (that is, assigned slot counter value>progressive slot counter value), increases the assigned slot counter value thereof by 1. Meanwhile, whenever a collision occurs, the reader increases the termination slot counter value by 1.

When tags A and B, which caused the collision in the second reading period, both select 1, the assigned slot counter value of tags A and B is 1, the assigned slot counter value of tag C is 2, and the termination slot counter value of the reader is 3.

Since, in a third reading period, a tag with an assigned slot counter value identical to the progressive slot counter value does not exist, feedback information from the reader is idle type information. Thus tags A, B and C, which each have assigned slot counter values greater than the progressive slot counter value, each decrease their assigned slot counter value by 1 and the reader decreases its termination slot counter value by 1.

In a fourth reading period, tags A and B, the assigned slot counter value of which is 0, send signals and cause a collision. Tags A and B, which caused the collision, each select one number of from among 0 and 1 and add the selected number to their assigned slot counter value. Tag C, which did not cause a collision, increases its assigned slot counter value by 1, and the reader increases the termination slot counter value by 1.

If, in the fourth reading period, tag A selected 0 and tag B selected 1, only tag A sends a signal and the reader feeds back readable type information in a fifth reading period. As a result, only the progressive slot counter value increases by 1.

In a sixth reading period, only tag B, which has an assigned slot counter value identical to the progressive slot counter value, sends a signal, thus tag B is identified and the progressive slot counter value increases by 1. In a seventh reading period, only tag C, which has an assigned slot counter value identical to the progressive slot counter value, that is, 2, sends a signal, thus tag C is identified and the progressive slot counter value increases by 1.

In an eighth reading period, the progressive slot counter value is identical to the termination slot counter value of the reader, therefore the reader and the tags terminate the tag identification frame.

Through the above-described process, at the end of the tag identification frame, tags A, B and C respectively have their own assigned slot counter values, that is, 0, 1 and 2, the respective tags maintain their own assigned slot counter values, and the reader maintains a termination slot counter value of 3.

Accordingly, if only tags A, B and C exist within the identification range of the reader after a single tag identification frame has been performed, the tag identification frame may be terminated in the fourth reading period.

Figure 3:
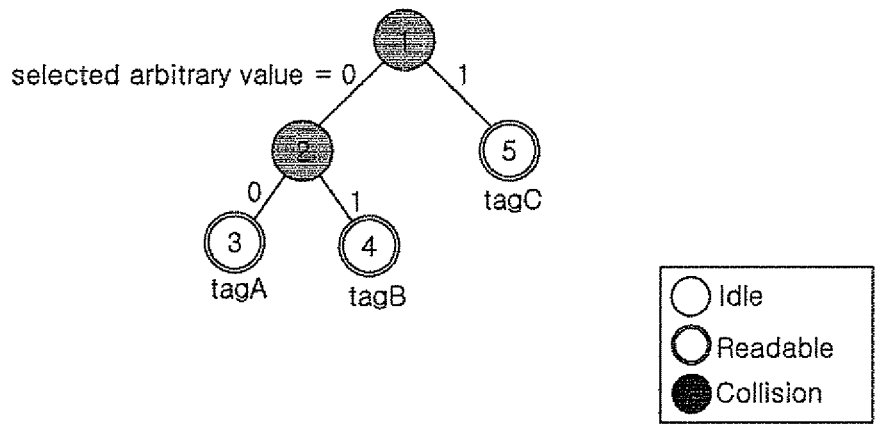
FIG. 3 is a conceptual diagram illustrating another embodiment of the method of identifying tags in an RFID system according to the present invention.
Figure 4:
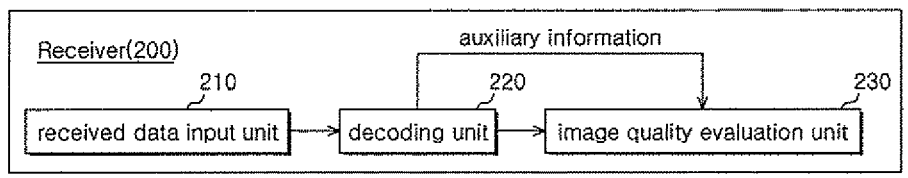
FIG. 4 is a tag identification table based on FIG. 3.

FIG. 3 is a conceptual diagram illustrating another embodiment of the tag identification method of the RFID system according to the present invention, and FIG. 4 is a tag identification table based on FIG. 3. FIGS. 3 and 4 show a case where tags A, B and C operate differently from the case of FIGS. 1 and 2.

As illustrated in the figures, in a first reading period, all three tags send signals and thus the reader feeds back collision type information. Tag A and B select an assigned slot counter value of 0, tag C selects an assigned slot counter value of 1, and the termination slot counter value of the reader is 2.

As tags A and B cause a collision in a second reading period, the termination slot counter value of the reader becomes 2.

When, according to reader feedback information in the second reading period, tag A selects 0 and tag B selects 1, the assigned slot counter value of tag A becomes 0 and the assigned slot counter value of tag B becomes 1 at the start of a third reading period. In this case, tag C increases its assigned slot counter value by 1 so that the assigned slot counter value of tag C, having caused no collision, does not become identical to the assigned slot counter value of tag B, which caused a collision and added 1 to its previous assigned slot counter value, with the result that the assigned slot counter value of tag C becomes 2.

In this case, tag A is identified in the third reading period, tag B is identified in the fourth reading period, and tag C is identified in the fifth reading period. Thereafter, the reader is aware that the termination slot counter value is identical to the progressive slot counter value in the sixth reading period, and terminates the tag identification frame.

As illustrated through FIGS. 1, 2, 3 and 4, the number of reading periods undergone until respective tags have their own independently assigned slot counter values varies depending on which of the binary numbers is selected by each of the tags that caused a collision.

FIG. 5 is a tag identification table illustrating a method of re-identifying identified tags according to the present invention. This figure shows the process in which the reader, which maintains the termination slot counter value, re-identifies tags A, B and C, which maintain respective independently assigned slot counter values as the result of the performance of the first tag identification frame shown in FIGS. 1 and 2 or FIGS. 3 and 4.

As illustrated in the figure, at the start of each tag identification frame the progressive slot counter value is initialized to 0, respective tags maintain the assigned slot counter values obtained at the end of a previous tag identification frame, and the reader also maintains the termination slot counter value.

As a result, tag A is identified in the first reading period, tag B is identified in a second reading period, and tag C is identified in a third reading period.

Thereafter, the reader becomes aware that its termination slot counter value and the progressive slot counter value are both 3, and thus are identical to each other, therefore the reader terminates the tag identification frame in a fourth reading period.

As described above, according to the tag identification method of the present invention, respective tags have independently assigned slot counter values that indicate time slots in which the tags will respectively send signals. The tags send their own IDs in their respective time slots, therefore the reader receives a single signal in a single time slot and can rapidly identify all the tags.

FIG. 6 is a conceptual diagram illustrating a method of re-identifying tags when a new tag enters, according to the present invention. FIG. 7 is a tag identification table based on FIG. 6, and shows a tag identification process in the case where new tag D, having an assigned slot counter value of 2, enters when tags A, B and C have independently assigned slot counter values through a previous tag identification frame.

As illustrated in the figures, at the start of a tag identification frame, tags A, B and C respectively maintain assigned slot counter values of 0, 1 and 2 from the result of a previous tag identification frame, and the reader maintains a termination slot counter value of 3. It is assumed that tag D newly enters from another group and has an assigned slot counter value of 2.

In a first reading period, only tag A that has an assigned slot counter value of 0, which is identical to the progressive slot counter value, sends a signal, and thus tag A is identified. In a second reading period, only tag B that has an assigned slot counter value of 1, which is identical to the progressive slot counter value, sends a signal, and thus tag B is identified.

Thereafter, in a third reading period, tags C and D that have an assigned slot counter value of 2, which is identical to the progressive slot counter value, send signals, and the reader feeds back collision type information.

Accordingly, tags C and D, having caused a collision, must each select one of either 0 or 1. In the present embodiment, tag C selects 0 and tag D selects 1. As two sub-groups are created, the reader increases the termination slot counter value by 1.

Accordingly, in a fourth reading period, only tag C that has an assigned slot counter value of 2, which is identical to the progressive slot counter value, sends a signal, thus tag C is identified. In a fifth reading period, tag D is identified, and in a sixth reading period, the identification frame is terminated.

Meanwhile, since in the embodiment of FIGS. 6 and 7 the assigned slot counter value, which is maintained by newly entering tag D, is less than the termination slot counter value of the reader, the reader can identify the tag. However, there may be cases where the assigned slot counter value of tag D is greater than the termination slot counter value of the reader. In this situation, in order to identify all of the tags, a tag having an assigned slot counter value greater than the termination slot counter value of the reader arbitrarily selects an assigned slot counter value from among values ranging from 0 to the termination slot counter value of the reader.

For this purpose, in the present invention the reader sends the termination slot counter value thereof to all of the tags at the start of a tag identification frame. When the assigned slot counter value of a tag is greater than the termination slot counter value of the reader, the tag arbitrarily selects an assigned slot counter value from among values ranging from 0 to the termination slot counter value of the reader, and sets the new assigned slot counter value.

As described above, according to the tag identification method of the present invention, since most tags have independently assigned slot counter values even when a new tag enters, the number of collisions between the tag signals is limited, and the reader can rapidly identify all of the tags.

Figure 8:
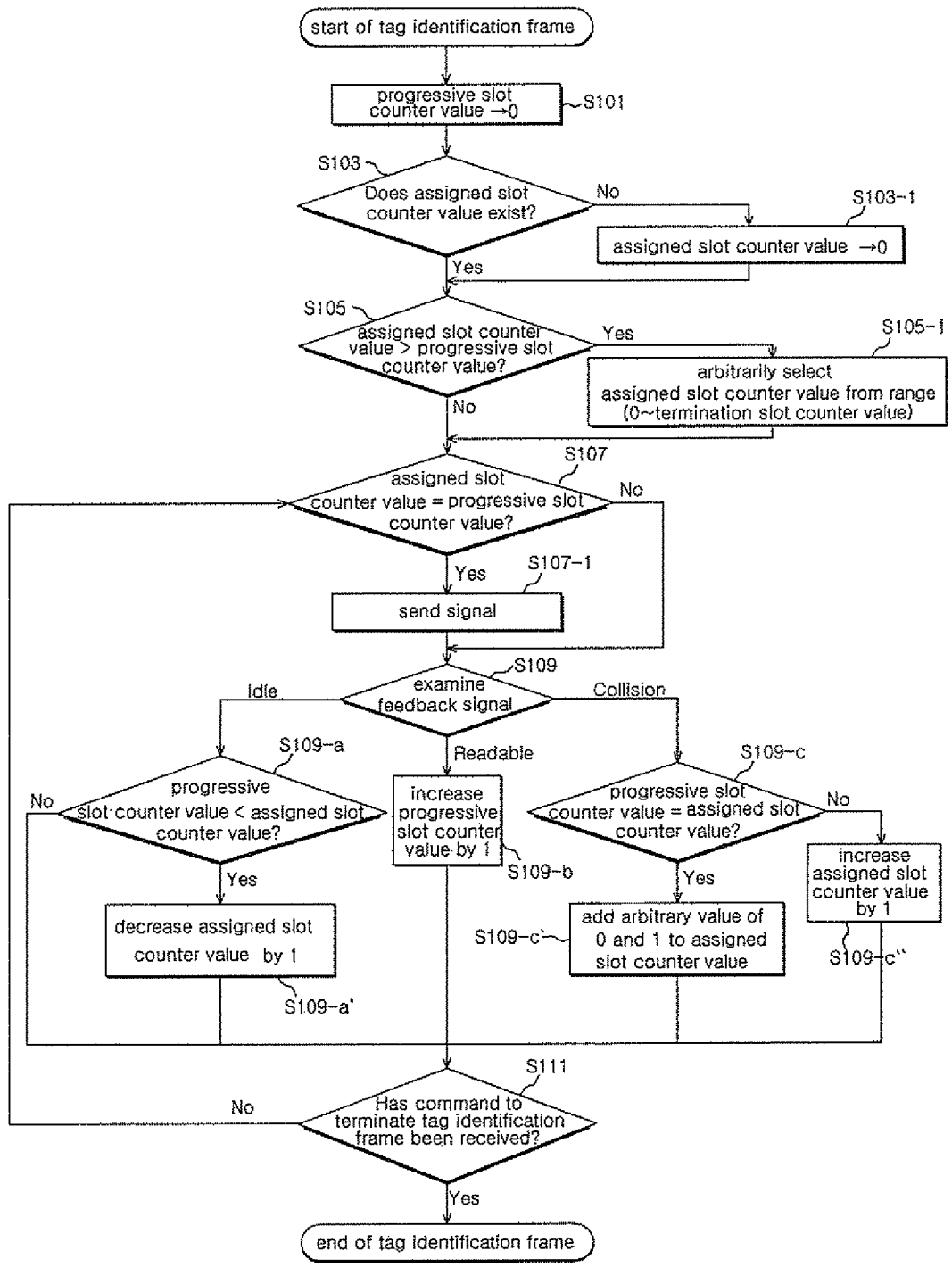
FIG. 8 is a flowchart sequentially illustrating the tag operation of a method of identifying tags according to an embodiment of the present invention.

FIGS. 8 and 9 are flowcharts sequentially illustrating the tag and reader operations of the above-described tag identification process.

First, the tag operation of FIG. 8 is described below.

As illustrated in FIG. 8, when a tag identification frame starts, a tag initializes its progressive slot counter value to 0 at step S101, determines whether the tag itself is maintaining an assigned slot counter value at step S103, initializes the assigned slot counter value to 0 if the assigned slot counter value is not being maintained at step S103-1, and preserves the current assigned slot counter value if the assigned slot counter value is being maintained.

Thereafter, when the tag receives a termination slot counter value from the reader at the start of a tag identification frame, the tag compares the assigned slot counter value thereof with the termination slot counter value at step S105. If, as a result of the comparison, the assigned slot counter value is greater than the termination slot counter value, the tag selects an arbitrary value from among values ranging from 0 to the termination slot counter value, and changes the assigned slot counter value at step S105-1.

When the setting of the progressive slot counter value and the assigned slot counter value is completed, the tag sends its ID to the reader at step S107-1 in a time slot for which the assigned slot counter value is identical to the progressive slot counter value at step S107.

Thereafter, when the reader sends any one piece of feedback information selected from among idle-type information, identification-type information and collision-type information to all the tags within the identification range thereof as the type information of the current time slot, each of the tags examines the received feedback information at step S109.

If, as a result of the examination, the feedback information is found to be an idle type, the tag decreases the assigned slot counter value by 1 at step S109-a' in the case where the assigned slot counter value is greater than the progressive slot counter value at step S109-a. If the feedback information is found to be a readable type, the tag increases the progressive slot counter value by 1 at step S109-b.

If the feedback information is found to be a collision type, the tag compares the progressive slot counter value with the assigned slot counter value so as to determine whether the tag itself caused a collision at step S109-c, selects an arbitrary value of either 0 or 1 and adds the selected value to the assigned slot counter value if the two values are identical to each other at step S109-c', and increases the assigned slot counter value by 1 if the two values are not identical to each other at step S109-c".

Meanwhile, when all of the tags have been identified, the reader sends a command to terminate the tag identification frame to the tags. If the tag receives the command to terminate the tag identification frame from the reader at step S111, the tag terminates the tag identification frame. Otherwise, the process returns to step S107 of determining whether the assigned slot counter value is identical to the progressive slot counter value, and repeats steps S107 to S111 until the reader has identified all of the tags.

Next, the reader operation of FIG. 9 is described below.

As illustrated in the drawing, at the start of a tag identification frame, the reader initializes its progressive slot counter value to 0, like the tag, at step S201, determines whether the reader itself has a termination slot counter value at step S203, sends the corresponding value to all tags within the identification range thereof if the reader has a termination slot counter value at step S203-1, and sets the termination slot counter value to 1 if the reader does not have a termination slot counter value at step S203-2.

Next, the reader examines signals from the tags in one reading period at step S205. If a signal is not received from any tag, the reader sends idle type information to the tags and then decreases the termination slot counter value by 1 at step S205-1. If only a single tag signal is received from a tag and the tag is identified, the reader sends readable type information to the tags and then increases the progressive slot counter value by 1 at step S205-2. If two or more tag signals are received and collide with each other, the reader sends collision type information to the tags and then increases the termination slot counter value by 1 at step S205-3.

Thereafter, the reader determines whether the progressive slot counter value is identical to the termination slot counter value at step S207. If, as a result of the determination, the two values are found to be identical to each other, the reader sends a command to terminate the tag identification frame to the tags at step S209 and then terminates the tag identification frame. If the two values are not identical to each other, the process returns to step S205 of examining tag signals, and repeats steps S205 to S207 until all the tags are identified.

Since those skilled in the art to which the present invention pertains, can implement the present invention in other specific forms without changing the technical spirit or essential features of the present invention, it should be understood that the above-described embodiments are illustrative and are not limitative in any respect. The scope of the present invention is defined by the following claims rather than the detailed description. It should be understood that all modifications or variations derived from the meaning and range of the claims and equivalents of the claims are included in the scope of the present invention.

INDUSTRIAL APPLICABILITY

According to the method of identifying a plurality of tags using an adaptive binary tree splitting technique in an RFID system and an RFID system therefor according to the present invention, a tree search space can be significantly reduced using information about tags already identified by a reader. Therefore, the reader can rapidly identify tags, and the number of tags that can be processed in a minimum period without collisions in the environment of a large-scale logistic system increases. All tags can be identified, therefore an efficient and fast RFID system and an efficient and fast network environment can be expected to be easily constructed.

The invention claimed is:

1. A Radio Frequency Identification (RFID) system limited to the use of a binary tree-based tag identification protocol for enabling an RFID reader to identify all RFID tags through continuous communication between the RFID tags and the RFID reader, comprising:

when a period, in which the RFID tags each send a signal, including an ID, to the RFID reader and the RFID reader sends feedback, is defined as a time slot, the RFID reader for sending one piece of information selected from among collision type information, indicating that signals from the RFID tags collide with each other; idle type information, indicating that there are no signals from the RFID tags; and readable type information, indicating that a signal has been received from a single RFID tag and the corresponding RFID tag has been identified, to all of the RFID tags within an identification range of the RFID reader, as type information of a specific time slot, depending on the number of signals sent from the RFID tags in the corresponding time slot; and the RFID tags for performing functions, in which, when information, indicating that a current time slot is a collision type, is fed back from the RFID reader, each of RFID tags that caused a collision selects one arbitrary value of either 0 or 1 and is assigned a time slot, in which a corresponding RFID tag will send a signal to the RFID reader, based on the selected value, a single tag group that caused a collision is divided into two sub-groups depending on the assigned time slots, and tags of the sub-groups send signals, including IDs thereof, to the RFID reader in different time slots for the respective sub-groups such that all of the RFID tags send signals in different time slots of a single tag identification frame wherein the RFID reader can identify all of the RFID tags from the signals in different time slots.

2. The RFID system as set forth in claim 1, wherein:

each of the RFID tags, in a tag identification frame, including a plurality of time slots that are required by the RFID reader to identify all of the RFID tags within a current identification range of the RFID reader, has a progressive slot counter value, indicating a number of time slots in each of which an RFID tag has been identified, and an assigned slot counter value, that is, a time slot number, indicating a sequential position for sending of a signal to the RFID reader, and sends a signal to the RFID reader at a start of a time slot if the progressive slot counter value thereof is identical to the assigned slot counter value thereof; and the RFID tag initializes the progressive slot counter value thereof to 0 at a start of a tag identification frame, increases the progressive slot counter value by 1 if time slot type information, fed back from the RFID reader, is a readable type, selects an arbitrary number of either 0 or 1 and then adds the selected number to the assigned slot counter value thereof if the time slot type information is a collision type, thereby allowing a tag group, including tags having caused a collision, to be divided into two sub-groups, and decreases the assigned slot counter value thereof by 1 to eliminate an unnecessary time slot if the time slot type information is an idle type.

3. The RFID system as set forth in claim 2, wherein the RFID tag decreases the assigned slot counter value thereof by 1 if the progressive slot counter value of the RFID tag is less than the assigned slot counter value of the RFID tag when time slot type information fed back from the RFID reader is an idle type.

4. The RFID system as set forth in claim 2, wherein, when the time slot type information fed back from the RFID reader is a collision type, the RFID tag selects one of either 0 or 1 and then adds the selected number to the assigned slot counter value thereof if the progressive slot counter value thereof is identical to the assigned slot counter value thereof, and adds 1 to the assigned slot counter value thereof if the progressive slot counter value Is less than the assigned slot counter value, therefore a currently created sub-group cannot be merged with another tag group.

5. The RFID system as set forth in claim 2, wherein the RFID tag maintains the assigned slot counter value thereof at the start of the tag identification frame, and initializes the assigned slot counter value thereof to 0 if the RFID tag does not have the assigned slot counter value.

6. The RFID system as set forth in any one of claims 1 to 5, wherein:

the RFID reader, in a tag identification frame, including a plurality of time slots that are required by the RFID reader to identify all of the RFID tags within a current identification range of the RFID reader, has a progressive slot counter value, indicating a number of time slots in each of which an RFID tag has been identified, and a termination slot counter value, indicating a number of tag groups to be identified, and becomes aware that all of the tags have been identified and then terminates a tag identification process when the termination slot counter value is identical to the progressive slot counter value; and the RFID reader initializes the progressive slot counter value to 0 at a start of a tag identification frame, increases the progressive slot counter value by 1 if type information of a current time slot sent to an RFID tag is a readable type, increases the termination slot counter value by 1 if the type information is a collision type, and decreases the termination slot counter value by 1 if the type information is an idle type.

7. The RFID system as set forth in claim 6, wherein the RFID tag reader initializes the termination slot counter value thereof to 0 if the RFID tag reader does not have the termination slot counter value at the start of the tag identification frame.

8. The RFID system as set forth in claim 6, wherein:
the RFID reader notifies all of the tags within the identification range thereof of the termination slot counter value at the start of the tag identification frame; and
the RFID tag sets the assigned slot counter value thereof to an arbitrary value in values ranging from 0 to the termination slot counter value of the RFID reader if the assigned slot counter value of the RFID tag is greater than the termination slot counter value of the RFID reader at the start of the tag identification frame, thereby enabling identification of an RFID tag that newly enters the identification range of the RFID reader.

9. A method of identifying a plurality of tags using an adaptive binary tree splitting technique in an RFID system, the method, when a period, in which RFID tags each send a signal, including an ID, to an RFID reader and the RFID reader sends a feedback, is defined as a time slot, and a plurality of time slots, which are required by the RFID reader to identify all the RFID tags within a current identification range of the RFID reader, constitutes a tag identification frame, enabling the RFID reader to identify all of the RFID tags in such a way that the RFID tags send signals in different time slots of a single tag identification frame:
wherein each of the RFID tags has a progressive slot counter value, indicating a number of time slots in each of which an RFID tag has been identified, an assigned slot counter value, that is, a time slot number, indicating a sequential position for sending of a signal to the RFID reader and a termination slot counter value indicating the number of tag groups that should be identified by the reader in a tag identification frame; the method comprising:
a first step of initializing the progressive slot counter value to 0 at a start of a tag identification frame;
a second step of determining whether the assigned slot counter value of the RFID tag is identical to the progressive slot counter value in a current time slot, and sending a signal, including an ID thereof, to the RFID reader if the two values are identical to each other, and maintaining a standby state if the two values are not identical to each other;
a third step of setting the progressive slot counter value and the assigned slot counter value according to received time slot type information when one piece of information selected from collision type information, indicating that signals from the RFID tags collide with each other, idle type information, indicating that there are no signals from the RFID tags, and readable type information, indicating that a signal has been received from a single RFID tag and the corresponding RFID tag has been identified, is received from the RFID reader that feeds type information of the current time slot back to all the RFID tags within an identification range of the RFID reader, depending on a number of signals received from the RFID tags;
wherein when the progressive slot counter value of each of the RFID tags equals the assigned slot counter value, each of the RFID tags that caused a collision selects a number of either a 1 or 0 which is added to the assigned slot counter value and the tag group of RFID tags that caused a collision is divided into two sub-groups with tags of the sub-groups sending signals, including IDs thereof, to the RFID reader in different time slots for the respective sub-groups such that all of the RFID tags will send signals in different time slots of a single tag identification frame, and
a fourth step of terminating the tag identification frame when the slot counter value is identical to the progressive slot counter value and returning to the second step if all of the tags have not been identified.

10. The method as set forth in claim 9, wherein step 3 comprises:
step 3-1 of determining whether the progressive slot counter value of the RFID tag is identical to the assigned slot counter value of the RFID tag when the RFID tag receives collision type information from the RFID reader; and
step 3-2 of selecting an arbitrary number of either 0 or 1 and then adding the selected number to the assigned slot counter value if, as a result of the termination at step 3-1, the two values are identical to each other, and increasing the assigned slot counter number of the RFID tag by 1 if the two values are not identical to each other.

11. The method as set forth in claim 9, wherein step 3 is the step of increasing the progressive slot counter value of the RFID tag by 1 when the RFID tag receives readable type information from the RFID reader.

12. The method as set forth in claim 9, wherein step 3 comprises:
step 3-1 of determining whether the progressive slot counter value of the RFID tag is less than the assigned slot counter value of the RFID tag when the RFID tag receives idle type information from the RFID reader; and
step 3-2 of decreasing the assigned slot counter value by 1 if, as a result of the determination at step 3-1, the progressive slot counter value is less than the assigned slot counter value.

13. The method as set forth in any one of claims 9 to 12, further comprising, after step 1 and before step 2:
step 1-1 of initializing the assigned slot counter value to 0 if the RFID tag does not have an assigned slot counter value.

14. The method as set forth in any one of claims 9 to 12, wherein, before step 1, the RFID tag receives the termination slot counter value, indicating the number of groups of RFID tags to be identified by the RFID reader, from the RFID reader at the start of the tag identification frame; and
further comprising, after step 1 and before step 2, step 1-2 of selecting an arbitrary value ranging from 0 to the termination slot counter value and then setting the selected value as the assigned slot counter value of the RFID tag if the assigned slot counter value of the RFID tag is greater than the termination slot counter value received from the RFID reader.

15. The method as set forth in any one of claims 9 to 12, wherein, at step 4, the RFID tag terminates the tag identification frame if a command to terminate the tag identification frame is received from the RFID reader after all of the tags within the identification range of the RFID reader have been identified by the RFID reader.

16. A method of identifying a plurality of tags using an adaptive binary tree splitting technique in an RFID system, the method, when a period, in which RFID tags each send a signal, including an ID, to an RFID reader and the RFID reader sends a feedback, is defined as a time slot, and a plurality of time slots, which are required by the RFID reader to identify all the RFID tags within a current identification range of the RFID reader, constitutes a tag identification frame, enabling the RFID reader to identify all the RFID tags in such a way that the RFID tags send signals in different time slots of a single tag identification frame:

wherein the RFID has a progressive slot counter value, indicating a number of time slots in each of which an RFID tag has been identified, and a termination slot counter value, indicating a number of tag groups to be identified by the RFID reader in a single tag identification frame; the method comprising:

a first step of initializing the progressive slot counter value thereof to 0 at a start of a tag identification frame;

a second step of feeding one piece of information selected from collision type information of a current time slot when signals are received from a plurality of RFID tags which indicate that the received signals have collided with each other, idle type information, indicating that there are no signals from the RFID tags, and readable type information, indicating that a signal has been received from a single RFID tag and the corresponding RFID tag has been identified, back to all the RFID tags within the identification range of the RFID reader, as type information of a current time slot, depending on the number of signals received from the RFID tags, in the current time slot, and setting the progressive slot counter value and termination slot counter value of the RFID reader according to the sent time slot type information, wherein if the received signals indicate the plurality of RFID tags have collided decreasing the termination slot counter value by 1; and a third step of determining whether the progressive slot counter value is identical to the termination slot counter value, terminating the tag identification frame if the two values are identical to each other, and returning to step 2 if the two values are not identical to each other.

17. The method as set forth in claim 16, wherein step 2 comprises:

step 2-1 of sending readable type information as type information of a current time slot if a signal is received from a single RFID tag and a corresponding tag is identified; and step 2-2 of increasing the progressive slot counter value by 1.

18. The method as set forth in claim 16, wherein step 2 comprises:

step 2-1 of sending idle type information as type information of a current time slot if a signal is not received from an RFID tag; and step 2-2 of increasing the termination slot counter value by 1.

19. The method as set forth in any one of claims 16 and 17-18, further comprising, before step 1:

the step of sending the termination slot counter value of the RFID reader to the RFID tags if the RFID reader has a termination slot counter value at the start of the tag identification frame, and initializing the termination slot counter value to 1 if the RFID reader does not have a termination slot counter value.

20. The method as set forth in any one of claims 16 and 17-18, wherein, at step 3, the RFID reader sends a command to terminate the tag identification frame to all of the RFID tags within the identification range, and then terminates the tag identification frame if the progressive slot counter value is identical to the termination slot counter value.

\* \* \* \* \*